US012794090B2

(12) United States Patent
Clark et al.

(10) Patent No.: US 12,794,090 B2
(45) Date of Patent: Nov. 10, 2026

(54) BATTERY TERMINAL

(71) Applicant: ILLINOIS TOOL WORKS INC., Glenview, IL (US)

(72) Inventors: Chad M. Clark, Stamping Ground, KY (US); Mark Beyer, Troy, MI (US); Gregory G. Buczynski, Ferndale, MI (US); Sean A. Tomaselli, Troy, MI (US)

(73) Assignee: Illinois Tool Works Inc., Glenview, IL (US)

( * ) Notice: Subject to any disclaimer, the term of this patent is extended or adjusted under 35 U.S.C. 154(b) by 1192 days.

(21) Appl. No.: 17/834,475

(22) Filed: Jun. 7, 2022

(65) Prior Publication Data

US 2022/0407195 A1 Dec. 22, 2022

Related U.S. Application Data

(60) Provisional application No. 63/289,901, filed on Dec. 15, 2021, provisional application No. 63/222,003, filed on Jul. 15, 2021, provisional application No. 63/211,715, filed on Jun. 17, 2021.

(51) Int. Cl.
*H01M 50/567* (2021.01)

(52) U.S. Cl.
CPC ................................ *H01M 50/567* (2021.01)

(58) Field of Classification Search
CPC .............................. H01M 50/567; H01R 4/48
See application file for complete search history.

(56) References Cited

U.S. PATENT DOCUMENTS 6,152,785 A * 11/2000 Haller .................. H01R 11/283
439/766
2022/0109135 A1* 4/2022 Altero ................. H01M 50/543

OTHER PUBLICATIONS

English translation of CN 105009327, 2015 (Year: 2015).*
English translation of JP2015/53121, Japan, Mar. 2019, pp. 1-20.*

* cited by examiner

*Primary Examiner* — Holly Rickman
(74) *Attorney, Agent, or Firm* — Quarles & Brady LLP

(57) ABSTRACT

A battery terminal includes a post clamp for connecting to a battery post. The post clamp includes a post connector having a first connector end and a second connector end with an opening therebetween. The post connector is configured to substantially enclose a first surface of the battery post. A mounting clamp is provided for reducing the opening between the first connector end and the second connector end. A fastener is disposed vertically above the mounting clamp and the post connector. The fastener is configured to be provided vertically above the second surface of the battery post for fastening the mounting clamp to the post clamp.

11 Claims, 17 Drawing Sheets

BATTERY TERMINAL

CROSS REFERENCE TO RELATED APPLICATIONS

This application claims priority to and the benefit of U.S. Provisional Patent Application Nos. 63/211,715, 63/222,003, and 63/289,901 filed in the United States Patent and Trademark Office on Jun. 17, 2021, Jul. 15, 2021, and Dec. 15, 2021, respectively, the entire contents of which are incorporated herein by reference as if fully set forth below in their entireties and for all applicable purposes.

BACKGROUND

1. Field of the Disclosure

Embodiments of the present disclosure generally relate to battery terminals and battery terminal retention methods for connecting to a battery post and cables.

2. Description of the Background of the Disclosure

Generally, battery post designs are tapered to ensure easier terminal installation. This provides a unique retention challenge in that the terminal naturally wants to travel in the direction of the taper and can be removed in extreme force conditions (e.g., a crash). Thus, it is desirable to provide a battery terminal that effectively connects a battery post to cables.

SUMMARY

The following presents a simplified summary of one or more aspects of the present disclosure, to provide a basic understanding of such aspects. While some examples may be discussed as including certain aspects or features, all discussed examples may include any of the discussed features. Unless expressly described, no one aspect or feature is essential to achieve technical effects or solutions discussed herein.

In one aspect, a battery terminal includes a post clamp for connecting to a battery post. The post clamp includes a post connector having a first connector end and a second connector end defining an opening therebetween. The post connector is configured to substantially enclose a first surface of the battery post. A mounting clamp is provided for reducing the opening between the first connector end and the second connector end. A fastener is disposed vertically above the mounting clamp and the post connector. The fastener is configured to be provided vertically above the second surface of the battery post for fastening the mounting clamp to the post clamp.

In another aspect, a method for fastening a battery terminal includes the step of pressing a mounting clamp to a post clamp in a first direction vertically above a battery post, wherein the post clamp comprises a post connector having a first connector end and a second connector end defining an opening therebetween. An additional step includes pressing, via the mounting clamp, a first angled guide or a second angled guide of the post clamp to reduce an opening of a post connector or the post clamp in a second direction at a substantially right angle to the first direction. Further steps include reducing a size of the opening and fastening the post connector to the battery post.

In a different aspect, a method for fastening a battery terminal includes the step of pressing a mounting clamp to a post clamp in a first direction vertically above a battery post, wherein the post clamp comprises a post connector having a first connector end and a second connector end defining an opening therebetween. The post connector is configured to substantially enclose a first surface of a battery post. Another step includes pressing, via the mounting clamp, an angled surface of the post connector toward a center of an opening of a post connector of the post clamp in a second direction at a substantially right angle to the first direction. Additional steps include reducing a size of the opening and fastening the post connector to the battery post.

These and other aspects of the battery terminal discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various tools, devices, systems, and methods.

DETAILED DESCRIPTION OF THE DRAWINGS

Figure 1:
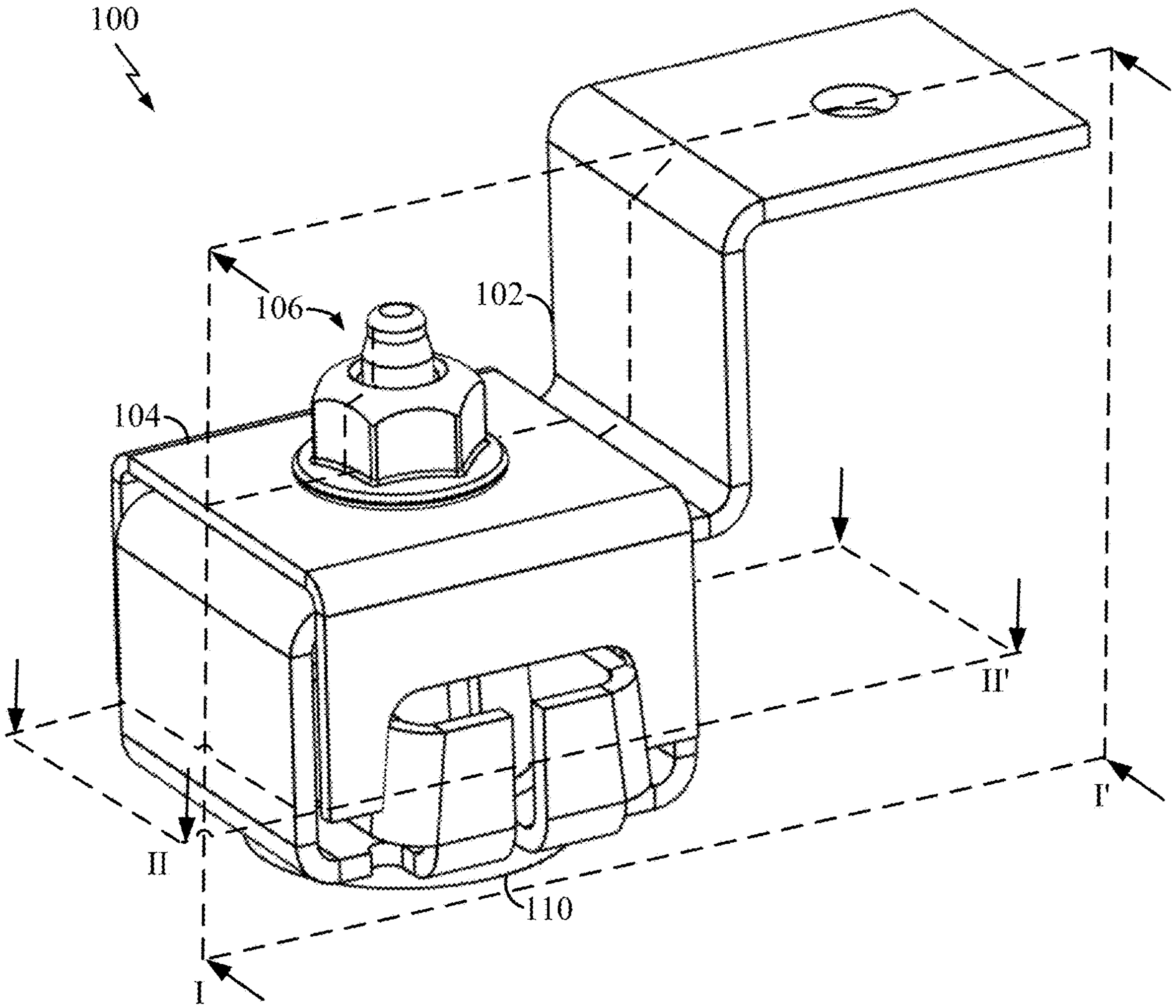
FIG. 1 illustrates an isometric view of an example of a battery terminal according to some embodiments.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

FIG. 1 illustrates an isometric view of an example of a battery terminal 100 according to some embodiments. The battery terminal 100 includes a post clamp 102, a mounting clamp 104, and/or a fastener 106. The post clamp 102 is seated onto a battery post 110 and is configured to be fastened to the battery post 110. The mounting clamp 104 is disposed above the post clamp 102 in a fastening position and provides a pressing force (e.g., a vertical force) to the post clamp 102 by the fastener 106 to fasten the post clamp 102 to the battery post 110. The post clamp 102 changes the pressing force to a fastening force (e.g., a horizontal force) to fasten the post clamp 102 to the battery post 110, as will be discussed in more detail below. Thus, since the mounting clamp 104 along with the fastener 106 can control the pressing force on the post clamp 102, the post clamp 102 can satisfy the retention requirements on the battery post 110 and horizontally provides an optimal connection to the battery post 110. In addition, since an operator fastens the fastener 106 vertically above the battery post 110 with a downward force to the post clamp 102 and the mounting clamp 104, the post clamp 102 is forced to sit on the battery post 110 and vertically provides an optimal connection to the battery post 110.

Figure 2:
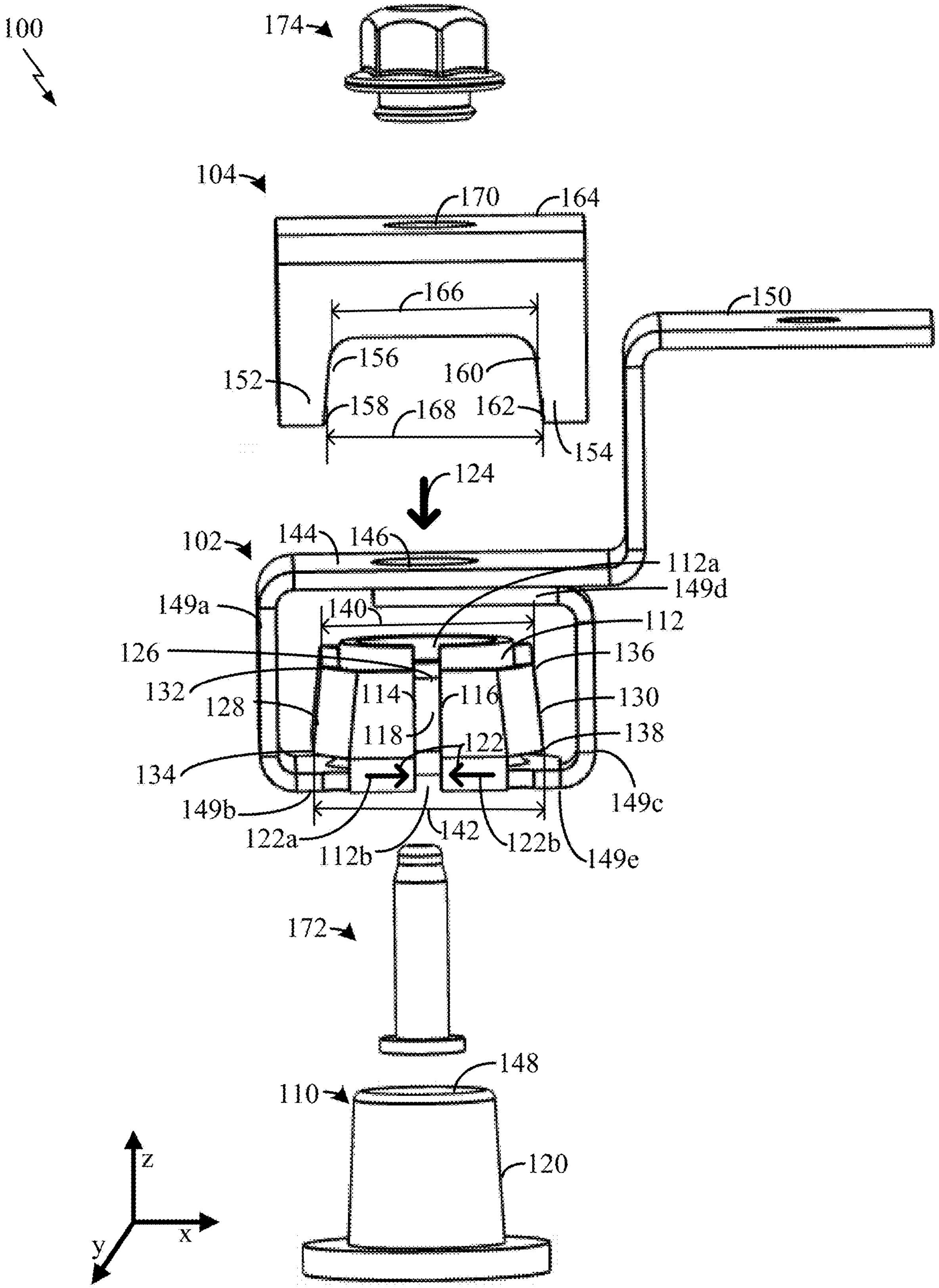
FIG. 2 is an exploded view of an example of the battery terminal of FIG. 1.
Figure 3:
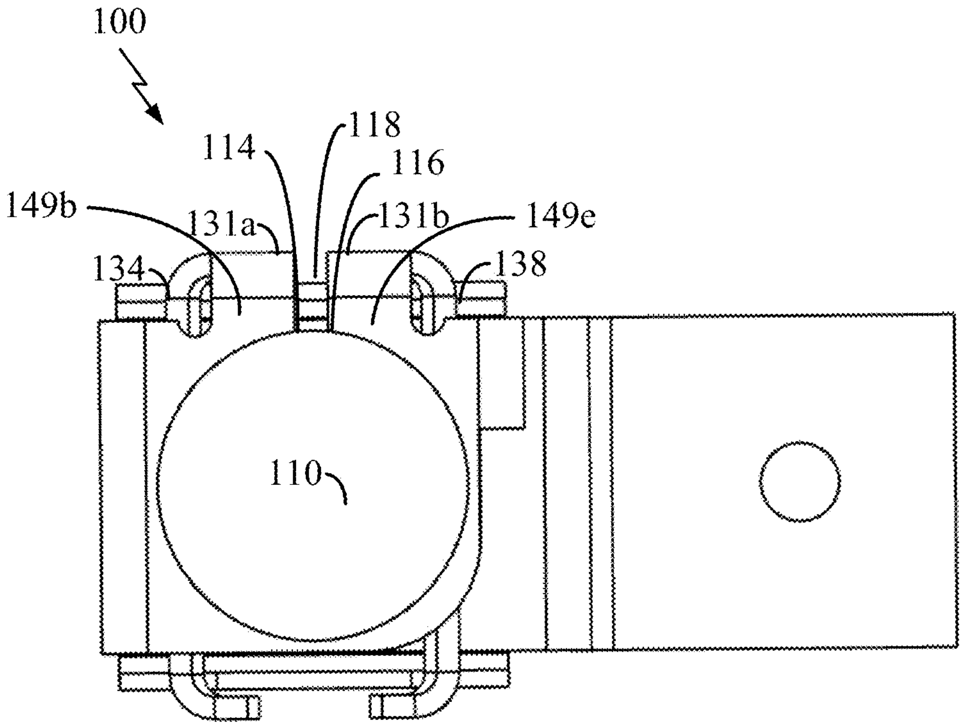
FIG. 3 is a bottom view of an example of the battery terminal of FIG. 1.

With reference to FIGS. 1-3, the battery terminal 100 includes the post clamp 102 for connecting to the battery post 110. The post clamp 102 includes a post connector 112 having a first connector end 114 and a second connector end 116 defining an opening 118 therebetween (see FIG. 3). The post connector 112 substantially encloses a first surface 120 of the battery post 110. The post connector 112 has a tapered cylindrical shape corresponding to the shape of the battery post 110. The opening 118 has an elongated shape extending between a top surface **112*a* and a bottom base 112*b* of the post connector 112. The opening 118 is disposed at a substantially right angle to the top surface 112*a* and to the bottom base 112*b* of the post connector 112 but could optionally be disposed at a different angle. In an unfastened position of the post clamp 102, the battery post 110 can be easily inserted into the post connector 112. Thus, the first surface 120 of the battery post 110 might not fully contact the inside of the post connector 112 in the unfastened position. In a fastened position of the post clamp 102, the opening 118 is reduced in a first direction 122 (e.g., a horizontal direction) such that the distance between the first connector end 114 and the second connector end 116 is shortened. The first direction 122 is a direction at a substantially right angle to an axis (z-axis) of the tapered cylindrical shape of the battery post 110. Also, the first direction 122 may be at a substantially right angle to a second direction 124 (e.g., a vertical direction) that is the same as the down force on the battery post 110 or the pressing force 124 of the mounting clamp 104 on the post clamp 102. As the opening 118 is reduced, the battery post 110 is fastened by the post connector 112, and the first surface 120 of the battery post 110 can fully contact the inside surface of the post connector 112 in the fastened position. The fastened and unfastened positions are further described below in connection with the mounting clamp 104**.

The inside surface of the post connector 112, which is configured to contact the first surface 120 of the battery post 110, includes a ribbed feature 126 (see FIG. 4), a barbed feature, or one or more protuberances to increase clamp retention onto the battery post 110. For example, the ribbed feature 126 or one or more protuberances may be a continuous or segmented ring shape that protrudes from the inside surface of the post connector 112. In some scenarios, natural porosity and other manufacturing defects in the battery post 110 can be a hurdle to optimal electrical conduction between the battery post 110 and the battery terminal 100. Thus, the ribbed feature 126 or one or more protuberances on the inside surface of the post connector 112 can dig into the first surface 120 of the battery post 110. This improves electrical conduction of the post clamp 102 to the battery post 110 and increases a clamp load onto the battery post 110. In addition, the ribbed feature 126 or one or more protuberances that have a segmented shape can provide anti-rotation benefits by stopping the post connector 112 from spinning as it is tightened.

Figure 5:
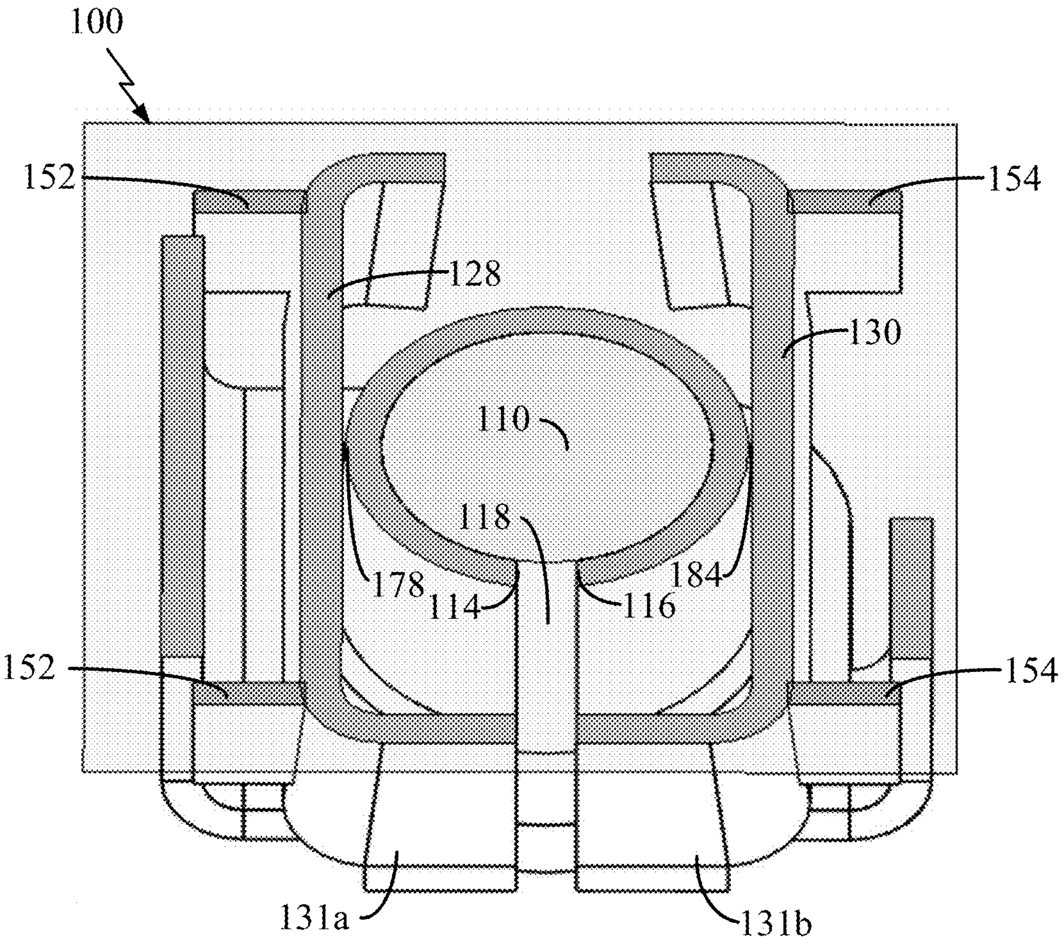
FIG. 5 is a sectional view of an example of the battery terminal taken along plane II-II' of FIG. 1.

With reference to FIGS. 2 and 5, the first connector end 114 and the second connector end 116 are connected to a first angled guide 128 and a second angled guide 130, respectively. The first and second angled guides 128, 130 are connected at the bottom base of the post connector 112. For example, the first and second angled guides 128, 130 are directly connected to first and second front plates **131*a*, 131*b*, respectively. The first front plate 131*a* is substantially at a right angle to the first angled guide 128 and is connected to the first connector end 114. The second front plate 131*b* is substantially at a right angle to the second angled guide 130 and is connected to the second connector end 116. However, it should be appreciated that the first angled guide 128 and the second angled guide 130 may be connected to any part of the post connector 112 to be connected to and work in cooperation with the first and second connector ends 114, 116, respectively. The first and second angled guides 128, 130 may be angled with respect to the second direction 124. For example, the first angled guide 128 includes a first guide end 132 and a second guide end 134, and the second angled guide 130 includes a third guide end 136 and a fourth guide end 138. The first and the third guide ends 132, 136 may be at the top of the first and second angled guides 128, 130, which corresponds to the top of the post connector 112. The second and fourth guide ends 134, 138 may be at the bottom of the first and second angled guides 128, 130, which corresponds to the bottom base of the post connector 112. A distance 140 between the first guide end 132 and the third guide end 136 is shorter than a distance 142 between the second guide end 134 and the fourth guide end 138. Thus, the distance between the first and second angled guides 128 and 130 is gradually shorter toward a top plate 144 of the post clamp 104. Due to the angled surfaces of the first and the second angled guides 128, 130, the pressing force 124 in the second direction changes to the fastening force 122 in the first direction. Thus, a first fastening force 122*a* on the first angled guide 128 directed toward the second connector end 116 and a second fastening force 122***b* on the second angled guide 130 directed toward the first connector end 114 reduces the opening 118. The first and second fastening forces 122 are provided by the mounting clamp 104.

As previously noted, the post clamp 102 includes the top plate 144. The mounting clamp 104 is configured to sit on the top plate 144 of the post clamp 102. The top plate 144 includes a hole 146 for the fastener 106 to fasten the mounting clamp 104 to the post clamp 102. The hole 146 is configured to be disposed vertically above a second surface 148 or the top surface of the battery post 110. Thus, operating a tool on the fastener 106 in the second direction (e.g., the vertical direction) may achieve optimal clamping of the post clamp 102 to the battery post 110 in the first direction 122 and at the same time ensure that the post clamp 102 fully seats down on the battery post 110 due to the downward force of the tool on the battery post 110 in the second direction 124.

The top plate 144 is connected at one edge to a first side plate 149*a*. The first side plate 149*a* extends substantially at a right angle to the top plate 144 and is substantially parallel to a surface of the first angled guide 128. Another edge of the first side plate 149*a* is connected to a first bottom plate 149*b*. The first bottom plate 149*b* is also connected to the first angled guide 128 via the first front plate 131*a*. The first bottom plate 149*b* is substantially parallel to the top plate 144. A second side plate 149*c* extends substantially at a right angle to the top plate 144 and is substantially parallel to a surface of the second angled guide 130. One edge of the second side plate 149*c* is connected to an upper plate 149*d*. The upper plate 149*d* abuts the top plate 144. Another edge of the second side plate 147*b* is connected to a second bottom plate 149*e*. The second bottom plate 149*e* is connected to the second angled guide 130. The second bottom plate 149*e* is also connected to the second angled guide 130 via the second front plate 131*b*. The second bottom plate 149*e* is substantially parallel to the top plate 144.

The post clamp 102 further includes a system connector 150 configured to be connected to a battery-operated system. The post clamp 102 may deliver an electric current from the battery post 110 of a battery to the battery-operated system via the system connector 150. In some examples, the system connector 150 may be attached to a battery cable, which is connected to the battery-operated system.

Referring still to FIG. 2, the battery terminal 100 also includes the mounting clamp 104 for fastening the post clamp 102 to the battery post 110. The mounting clamp 104 is configured to reduce the opening 118 between the first connector end 114 and the second connector end 116 in the first direction 122. The mounting clamp 104 substantially covers the second surface 148 (e.g., a top surface) of the battery post 110. The mounting clamp 104 may provide the pressing force 124 to the post clamp 102 in the second direction 124 (e.g., the vertical direction) at a substantially right angle to the first direction 122 in the fastened position. Because the fastener 106 attaches the mounting clamp 104 to the post clamp 102, the mounting clamp 104 produces the pressing force 124 in the fastening position, which is a downward force on the first and second angled guides 128, 130. For example, the mounting clamp 104 produces the pressing force 124 to the first angled guide 128 and the second angled guide 130 in the second direction 124. The pressing force 124 on the first angled guide 128 and the second angled guide 130 in the second direction 124 changes to a fastening force 122 in the first direction 122 due to the angled surfaces of the first and second angled guides 128, 130. Thus, in the fastening position, the first angled guide 128 provides a first fastening force 122*a* toward the second connector end 116 of the post connector 112 and the second angled guide 130 provides a second fastening force 122*b* toward the first connector end 114 of the post connector 112. Thus, the first and second fastening forces 122 reduce the opening 118.

The mounting clamp 104 includes a first limb 152 and a second limb 154. The first limb 152 may include a first limb end 156 and a second limb end 158 corresponding to the first guide end 132 and the second guide end 134 of the first angled guide 128, respectively. Also, the second limb 154 may include a third limb end 160 and a fourth limb end 162 corresponding to the third guide end 136 and the fourth guide end 138 of the second angled guide 130, respectively. In some examples, the first limb end 156 and the third limb end 160 are close to a top plate 164 of the mounting clamp 104. The second limb end 158 and the fourth limb end 162 are at the bottom or the limb end of the mounting clamp 104. A distance 166 between the first limb end 156 and the third limb end 160 is shorter than a distance 168 between the second limb end 158 and the fourth limb end 162. Also, the distance 168 between the second limb end 158 and the fourth limb end 162 is longer than the distance 140 between the first guide end 132 and the third guide end 136. Thus, the top 132, 136 of the first and second angled guides 128, 130 can be easily inserted into the bottom 158, 162 of the mounting clamp 104. The distance 168 between the second limb end 158 and the fourth limb end 162 may be shorter than the distance 142 between the second guide end 134 and the fourth guide end 138 in the unfastened position. In some embodiments, the first limb 152 and the second limb 154 are a mirror image of the other two limbs on the opposite side of the mounting clamp 104, which is not shown in FIG. 2. For example, the mounting clamp 104 includes another set of the first and second limbs. Thus, the mounting clamp 104 includes four limbs. A pair of the first limbs of the mounting clamp 104 corresponds to the first angled guide 128, and a pair of the second limbs of the mounting clamp 104 corresponds to the second angled guide 130.

In the unfastened position, the second limb end 158 contacts a point between the first guide end 132 and the second guide end 134 of the first angled guide 128, and the fourth limb end 162 contacts a point between the third guide end 136 and the fourth guide end 138 of the second angled guide 130. This creates a space between the top plate 144 of the post clamp 102 and the top plate 164 of the mounting clamp 104. When in the unfastened position, the mounting clamp 104 and the post clamp 102 may be assembled but are not tightened by the fastener 106. As the fastener 106 fastens and tightens the mounting clamp 104 to the post clamp 102, the top plate 164 of the mounting clamp 104 moves toward the top plate 144 of the post clamp 102. Also, the space between the top plate 144 of the post clamp 102 and the top plate 164 of the mounting clamp 104 is reduced, and the pressing force 124 of the first and the second limbs 152, 154 of the mounting clamp 104 on the first and second angled guides 128, 130 increases. As the pressing force increases, interference on the first and second angled guides 128, 130 increases, and the first and second fastening forces 122*a*, 122*b* increase. Thus, the increased first fastening force 122*a* moves the first connector end 114 toward the second connector end 116, and the increased second fastening force 122*b* moves the second connector end 116 toward the first connector end 114. Further, the opening 118 is reduced, and the post connector 112 in the post clamp 102 provides a clamp load onto the battery post 110. In the fastened position, the opening 118 between the first connector end 114 and the second connector end 116 is smaller than the opening 118 in the unfastened position. When in the fastened position, the mounting clamp 104 and the post clamp 102 are assembled and fully tightened by the fastener 106 such that the post clamp 102 via the mounting clamp 104 provides sufficient clamp load onto the battery post 110.

As noted previously, the mounting clamp 104 includes the top plate 164. The top plate 164 is configured to cover at least a part of the top plate 144 of the post clamp 102. The top plate 164 of the mounting clamp 104 includes a hole 170 for the fastener 106 to fasten the mounting clamp 104 to the post clamp 102. The hole 170 is disposed vertically above the second surface 148 or the top surface of the battery post 110.

Figure 4:
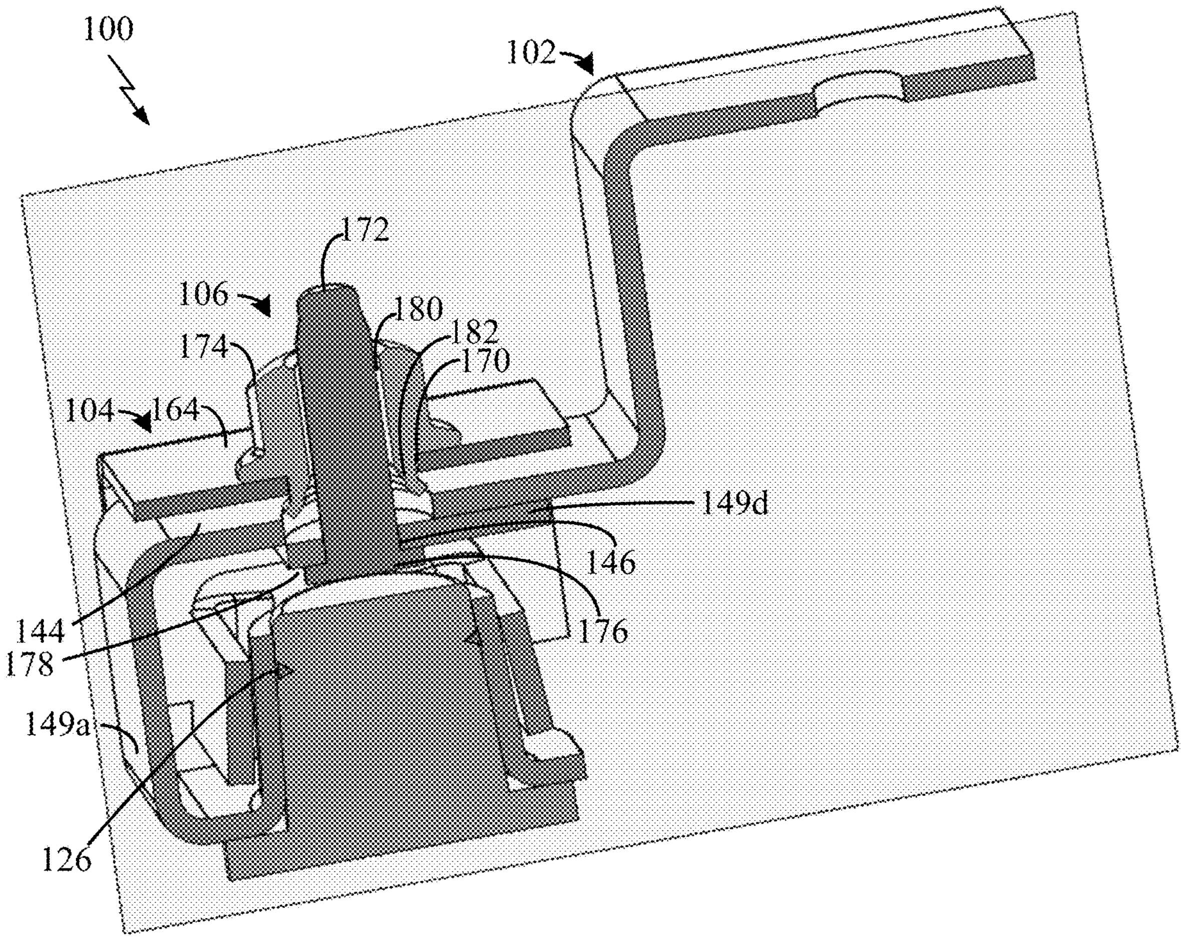
FIG. 4 is a sectional view of an example of the battery terminal taken along plane I-I' of FIG. 1.

With reference to FIG. 4, the battery terminal 100 also includes the fastener 106 configured to be disposed above the battery post 110 for fastening the mounting clamp 104 to the post clamp 102. The fastener 106, 108 includes a stud 172 and a nut 174. The stud 172 and the nut 174 are disposed vertically over the second surface 148 of the battery post 110. The stud 172 is extended at a substantially right angle to the second surface 148 of the battery post 110 such that the nut 174 is configured to be inserted in the stud 172 in the second direction 124 at the substantially right angle to the second surface 148 of the battery post 110. Thus, when a tool (e.g., socket driver) tightens the nut 174, the operator of the tool may use a downward force to tighten the nut 174. Thus, the tool for the nut 174 is configured to be axially in-line with battery post 110. The downward force on the post clamp 102 ensures that it fully seats down on the battery post 110. At the same time, the stud 172 and the nut 174 fasten the top plate 164 of the mounting clamp 104 to the top plate 144 of the post clamp 102. This clamping mechanism provides a pressing force 124 on the first and second angled guides 128, 130 and changes the vertical pressing force 124 to the horizontal fastening force 122 to reduce the size of the opening 118. This clamping mechanism therefore interacts with the top-down tool such that it provides the maximum clamp force onto the battery post 110. Using this clamping mechanism, the battery terminal 100 can be fully installed when the bottom base 112*b* of the post connector 112 contacts the bottom surface of battery post 110.

Referring still to FIG. 4, the stud 172 is shown attached to the post clamp 102. More specifically, a head 176 of the stud 172 is clenched to a bottom surface 178 of the upper plate 149*d* of the post clamp 102, which is opposite to a top surface of the top plate 144. Thus, the stud 172 may not move up/down or rotate. In other embodiments, the stud 172 is part of the post clamp 102. In addition, the stud 172 has a thread 180 having a cylindrical shape on a side surface of the stud 172. The stud 172 may protrude from the top plate 144 of the post clamp 102 through the hole 146 on the top plate 144. The diameter of the stud fits into the hole 146 on the top plate 144 of the post clamp 102, and the size of the head 176 is larger than the hole 146 of the post clamp 102.

The nut 174 is a free-spinning nut attached to the mounting clamp 104. The free-spinning nut 174 is attached on the top plate 164 of the mounting clamp 104 and may turn freely on the stud 172 until the mounting clamp 104 is fastened to the post clamp 102. For example, the nut 174 is attached to the mounting clamp 104 via a cylindrical section 182 in the hole 170 of the mounting clamp 104. The cylindrical section 182 fits through the hole 170 of the mounting clamp 104 and is flared outward to retain the nut 174 in the mounting clamp 104. However, it should be appreciated that any other suitable nut can be used to fasten the mounting clamp 104 to the post clamp 102. In another embodiment, a loose nut (not pre-assembled) is used as the fastener 108. Accordingly, since the stud 172 is attached to the upper-bottom surface 178 of the post clamp 102, the nut 174 spins onto the stud 172 toward the head 176 of the stud 106 and presses the top plate 164 of the mounting clamp 104 to the top plate 144 of the post clamp 102. This generates the pressing force 124 of the mounting clamp 104 to the post clamp 102. Thus, in the fastened position, the mounting clamp 104 provides the pressing force 124 to the post clamp 102 based on the stud 172 and the nut 174.

Turning to FIG. 5, the mounting clamp 104 is shown to include two first limbs 152 and two second limbs 154 configured to provide a pressing force 124 onto the first and second angled guides 128, 130. The first and second angled guides 128, 130 are substantially parallel with a direction from the center of the post connector 112 to the opening 118. The first angled guide 128 provides a first fastening force toward the second angled guide 130 or the second connector end 116 in the fastened position. The second angled guide 130 provides a second fastening force toward the first angled guide 128 or the first connector end 114 in the fastened position. Thus, as the fastener 106 fastens the mounting clamp 104 to the post clamp 102, the first angled guide 128 moves toward the second angled guide 130 or the second connector end 116, while the second angled guide 130 moves toward the first angled guide 128 or the first connector end 114. Thus, the size of the opening 118 is reduced, and the post connector 112 clamps the battery post 110. In some embodiments, the first angled guide 128 presses one side 178 of the post connector 112 toward the second angled guide 130 while the second angled guide 130 presses an opposite side 184 of the post connector 112 toward the first angled guide 128. Thus, the opening 118 can be reduced.

Figure 6:
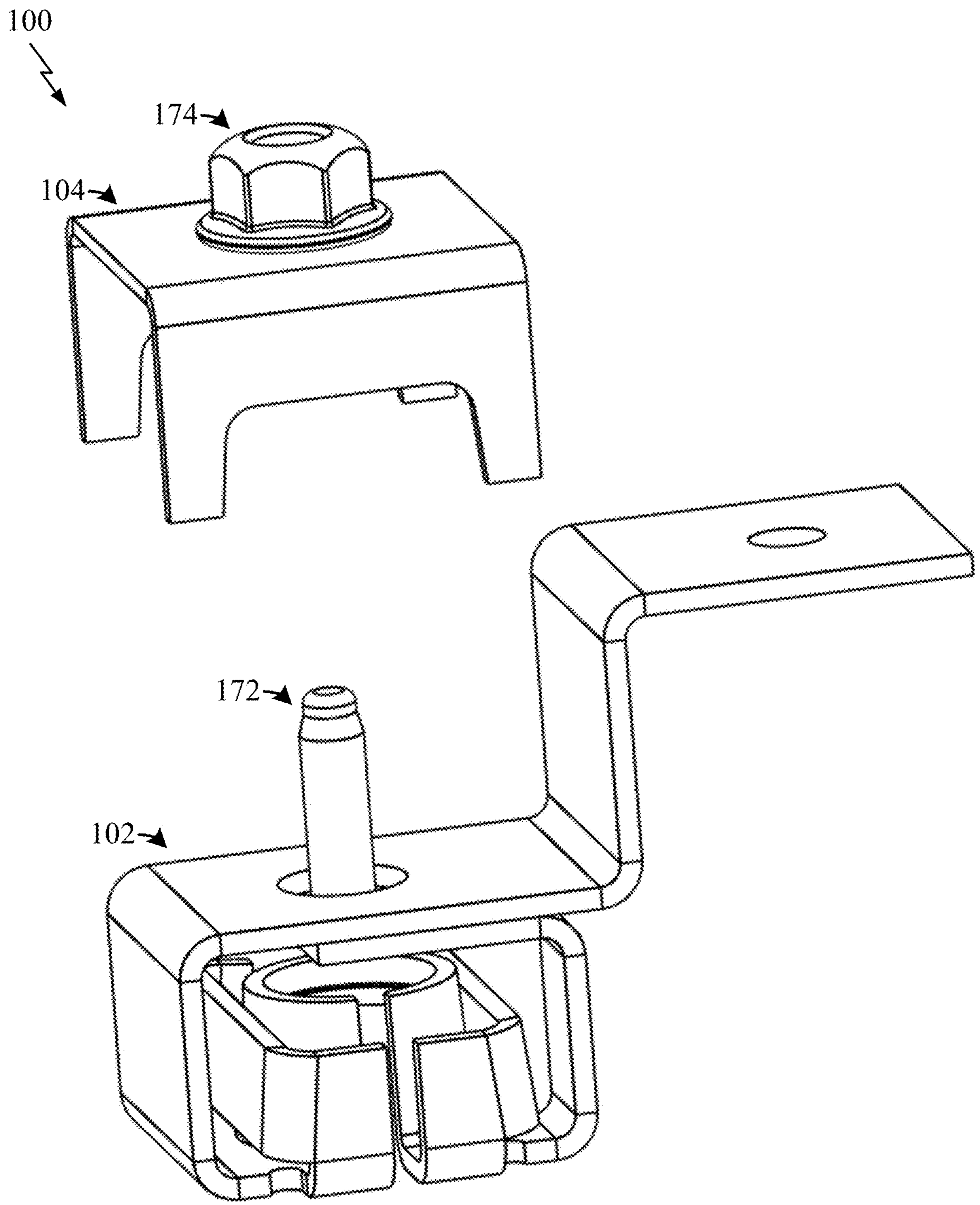
FIG. 6 is an isometric view of an example of the preassembled battery terminal of FIG. 1.

With reference to FIG. 6 the mounting clamp 104 and the nut 174 are preassembled as one piece, and the post clamp 102 and the stud 172 are preassembled as another piece. In other embodiments, three preassembled pieces may exist. For example, the mounting clamp 104 and the nut 174 are two separate pieces, and the post clamp 102 and the stud 172 are preassembled as the other piece.

Figure 7:
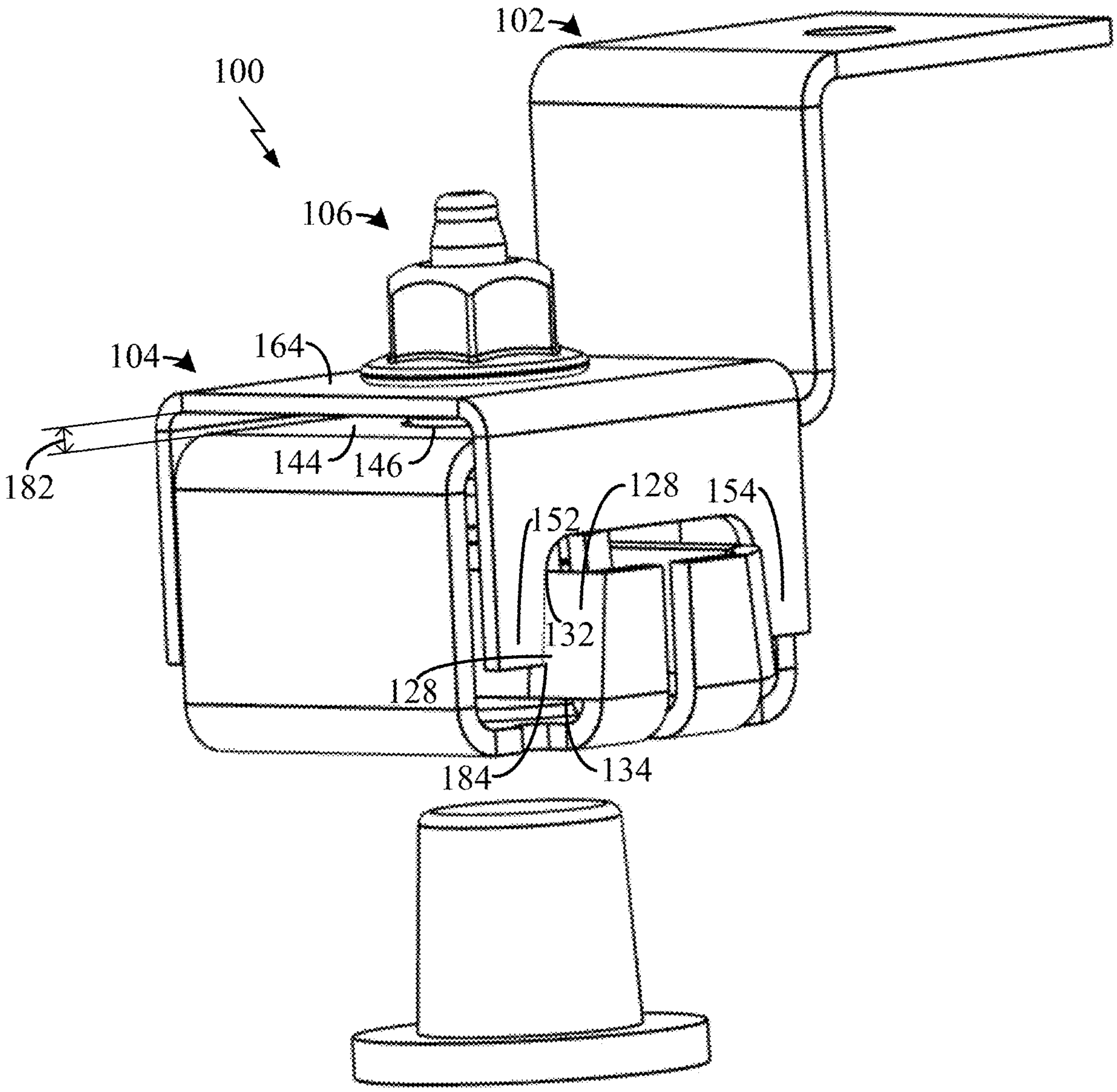
FIG. 7 is an isometric view of another example of the preassembled battery terminal of FIG. 1.

FIG. 7 is an isometric view of another preassembled battery terminal 100 of FIG. 1 according to some embodiments. In a manufacturing setting, all four components (the mounting clamp 104, the post clamp 102, the stud 172, and the nut 174) can be preassembled together. This preassembly can be preassembled using the stud 172 and the nut 174, which extend through the hole 146 in the post clamp 102. The preassembled terminal 100 in the unfastened position has a space 182 between the top plate 164 of the mounting clamp 104 and the top plate 144 of the post clamp 102. In the unfastened position, the first limb 152 of the mounting clamp 104 meets a contact point 184 between the first and second guide ends 132, 134 of the first angled guide 128. The second limb 154 of the mounting clamp 104 works in a similar way as the first limb 152. The space 182 between the top plate 164 of the mounting clamp 104 and the top plate 144 of the post clamp 102 indicates that the first and second limbs 152, 154 of mounting clamp 104 can move toward the second and fourth guide ends 134, 138, respectively. Thus, as the battery terminal 100 is fastened, the first and second fastening forces of the first and second angled guides 128, 130, respectively, are created to reduce the opening 118 of the post clamp 102.

Figure 8:
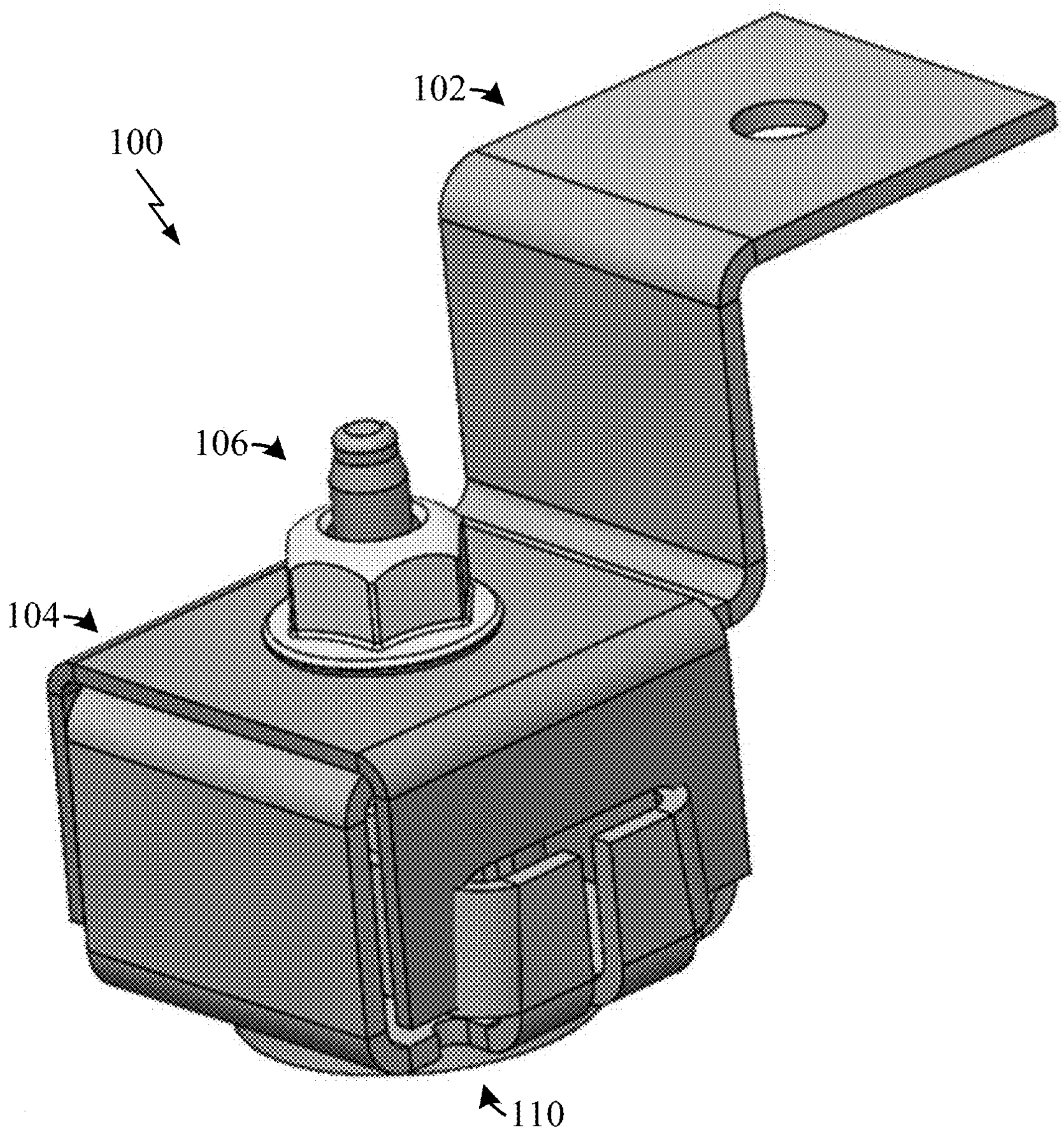
FIG. 8 is an isometric view of an example of the preassembled and fastened battery terminal of FIG. 1.

FIG. 8 is an isometric view of the preassembled and fastened battery terminal 100 of FIG. 1 according to some embodiments. In the fastened position, the space between the top plate 164 of the mounting clamp 104 and the top plate 144 of the post clamp 102 does not exist or at least is reduced compared to the space 182 in the unfastened position shown in FIG. 7.

Figure 9:
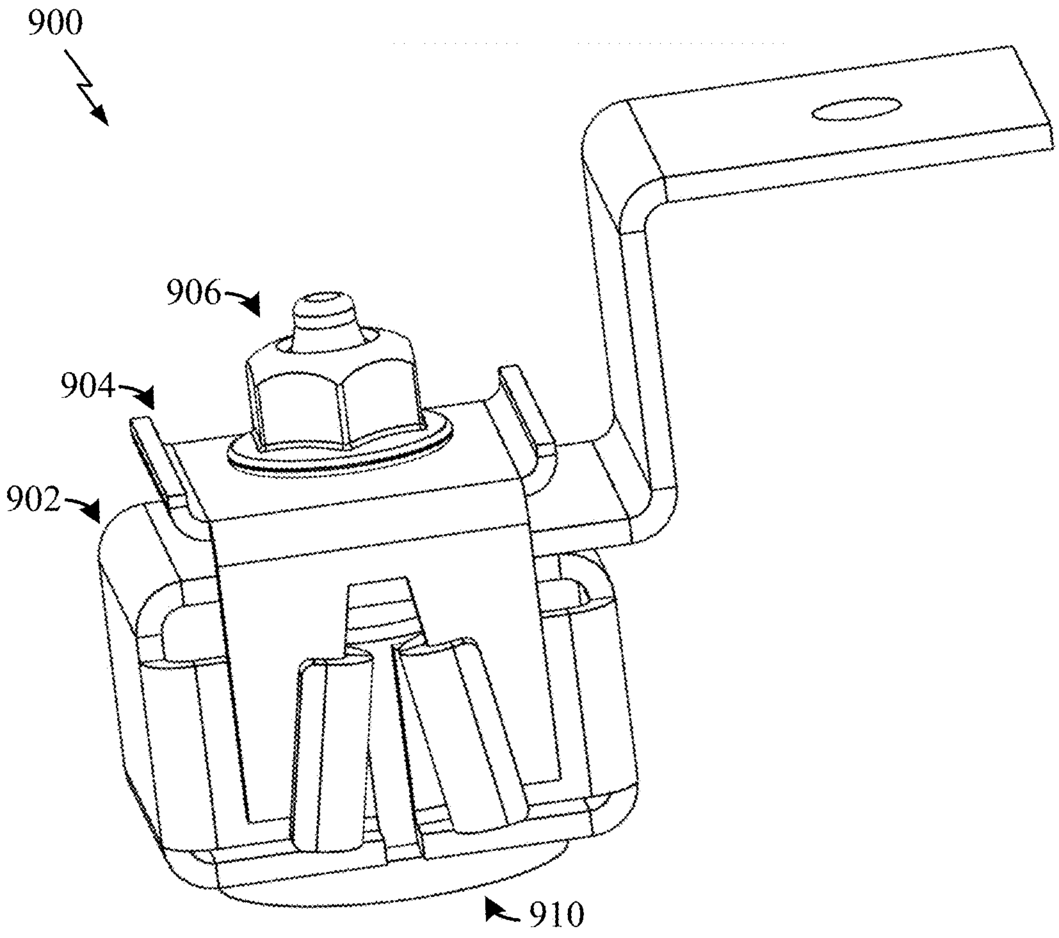
FIG. 9 illustrates an isometric view of an example of a battery terminal according to some embodiments.
Figure 10:
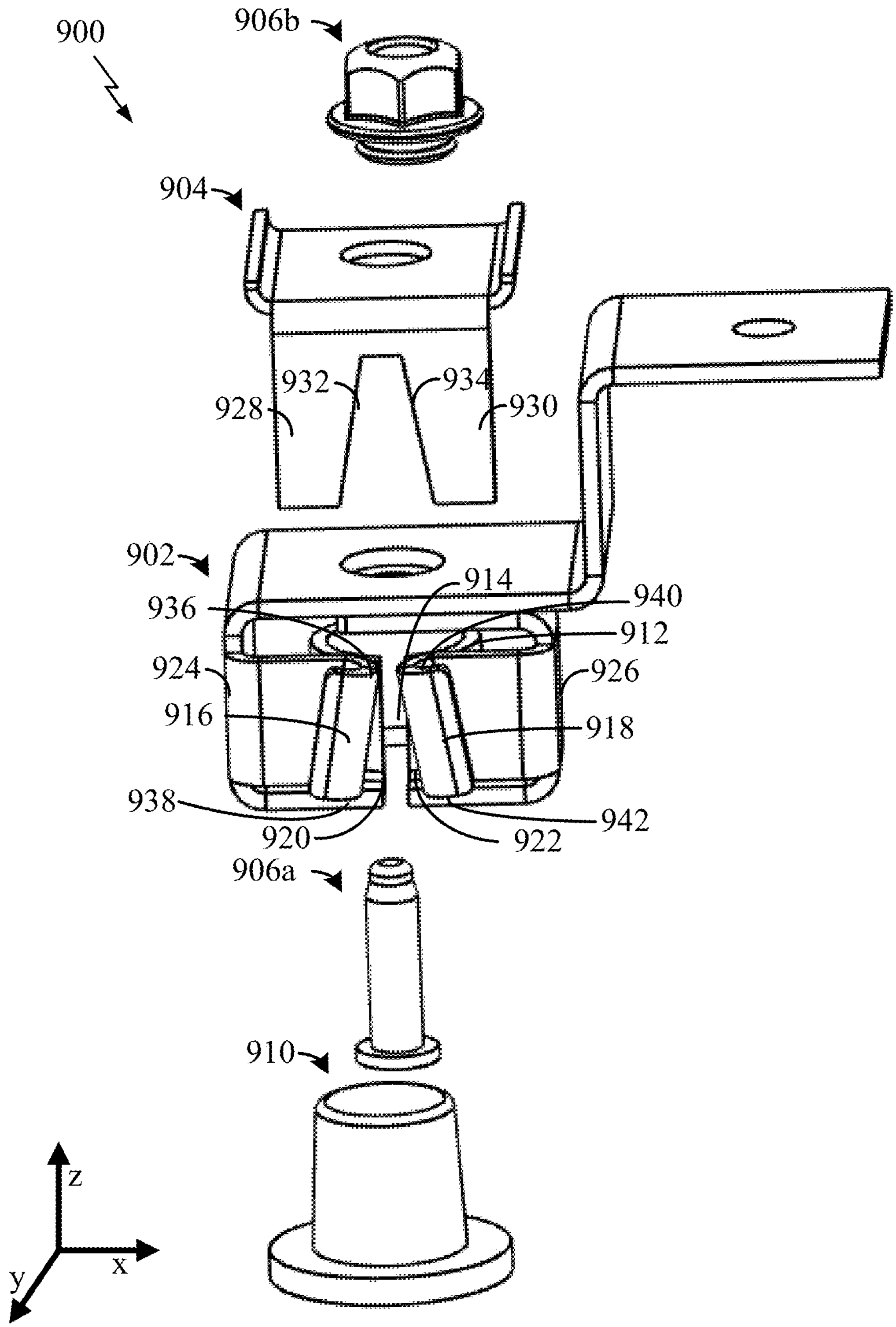
FIG. 10 is an exploded view of an example of the battery terminal of FIG. 9.
Figure 11:
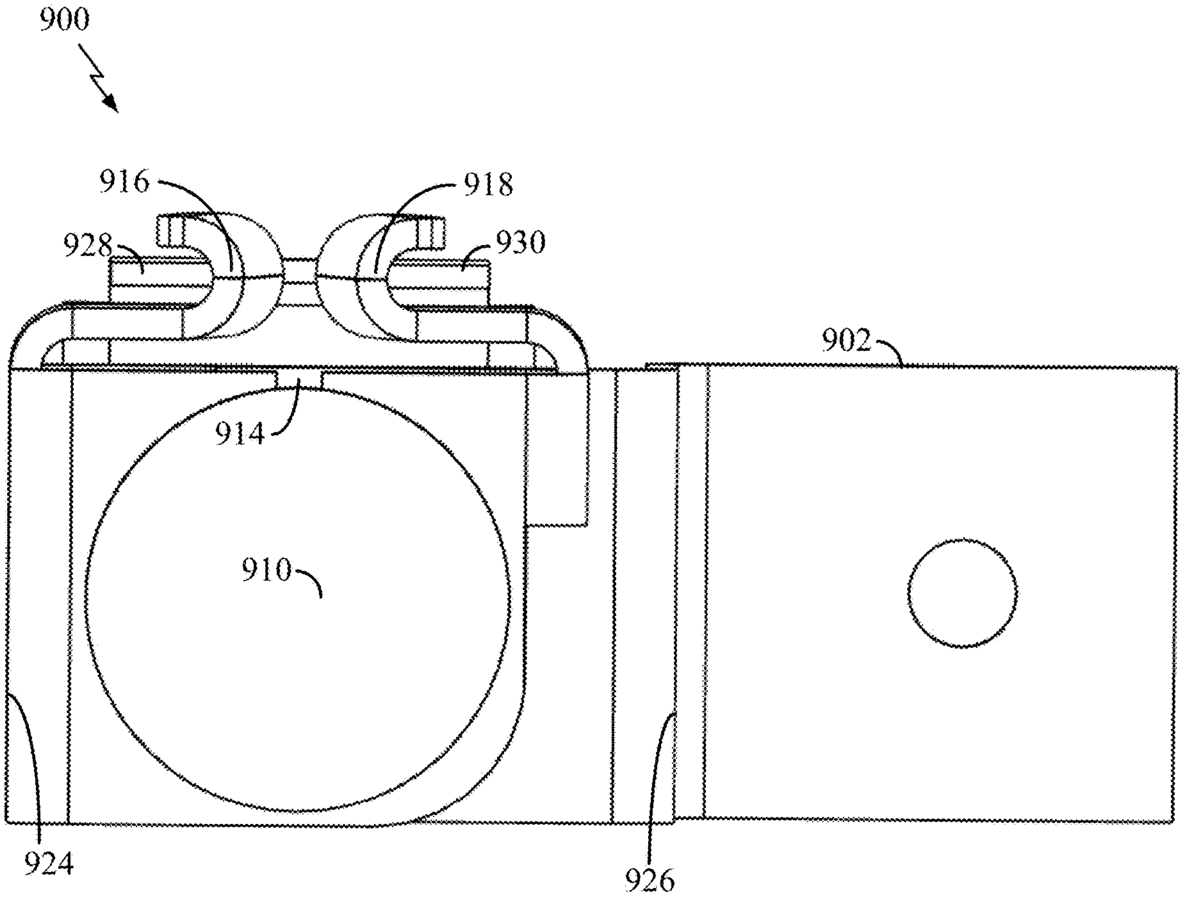
FIG. 11 is a bottom view of an example of the battery terminal of FIG. 9.

FIGS. 9-11 illustrate a second embodiment of a battery terminal 900 according to some embodiments. The battery terminal 900 may include a post clamp 902, a mounting clamp 904, and/or a fastener 906 (e.g., a stud 906*a* and a nut 906*b*) for fastening the battery terminal 900 to a battery post 910. The battery terminal 900, except for the description below, may function in a similar way as does the battery terminal 100 described in connection with FIGS. 1-8.

The post clamp 902 includes a post connector 912, an opening 914, a first angled guide 916, and/or a second angled guide 918. The post connector 912 includes a first connector end 920 and a second connector end 922 to define the opening 914 between the first connector end 920 and the second connector end 922. In some examples, the first and second connector ends 920, 922 are connected to the first and second angled guides 916, 918, respectively. Thus, moving the first angled guide 916 and the second angled guide 918 leads to the movement of the first connector end 920 and the second connector end 922. For example, the first and second connector ends 920, 922 are connected to first and second surfaces 924, 926, respectively. The first and second surfaces 924, 926 are substantially parallel with a plane defined by the axis (z-axis) of the post connector 912 and the opening 914. The axis (z-axis) of the post connector 912 indicates the axis (z-axis) of the tapered cylinder of the post connector 912. However, it should be appreciated that the first and second surfaces 924, 926 may be any surface, any edge, or any part of the post clamp 902 to connect the first and second connector ends 920, 922 to the first and second angled guides 916, 918. The first and second angled guides 916, 918 are connected to the first and second surfaces 924, 926, respectively. The first and second angled guides 916, 918 are close to or next to the opening 914. In some examples, a plane connecting from the axis (z-axis) of the post connector 912 to the opening 914 constitutes the center between the first angled guide 916 and the second angled guide 918 and between the first connector end 920 and the second connector end 922. The first and second angled guides 916, 918 substantially enclose at least parts of angled edges of the mounting clamp 904.

The mounting clamp 904 includes a first limb 928 and a second limb 930. The first and second limbs 928, 930 include first and second angled edges 932, 934, respectively. In some embodiments, the first and second angled edges 932, 934 together substantially constitute a reverse V shape ('/\'). In the unfastened position, one end of the first angled edge 932 has a contact point on the first angled guide 916 between first guide end 936 and the second guide end 938, and one end of the second angled edge 934 may have a contact point on the second angled guide 918 between third guide end 940 and the fourth guide end 942. As the mounting clamp 904 is fastened to the post clamp 902, the first and second angled edges 932, 934 move toward the second and fourth guide ends 938, 942, respectively. Then, the first and second angled guides 916, 918 move toward each other, and the first and second connector ends 920, 922 move toward each other to reduce the opening 914. The reduced opening 914 fastens the post connector 912 onto the battery post 910.

Figure 12:
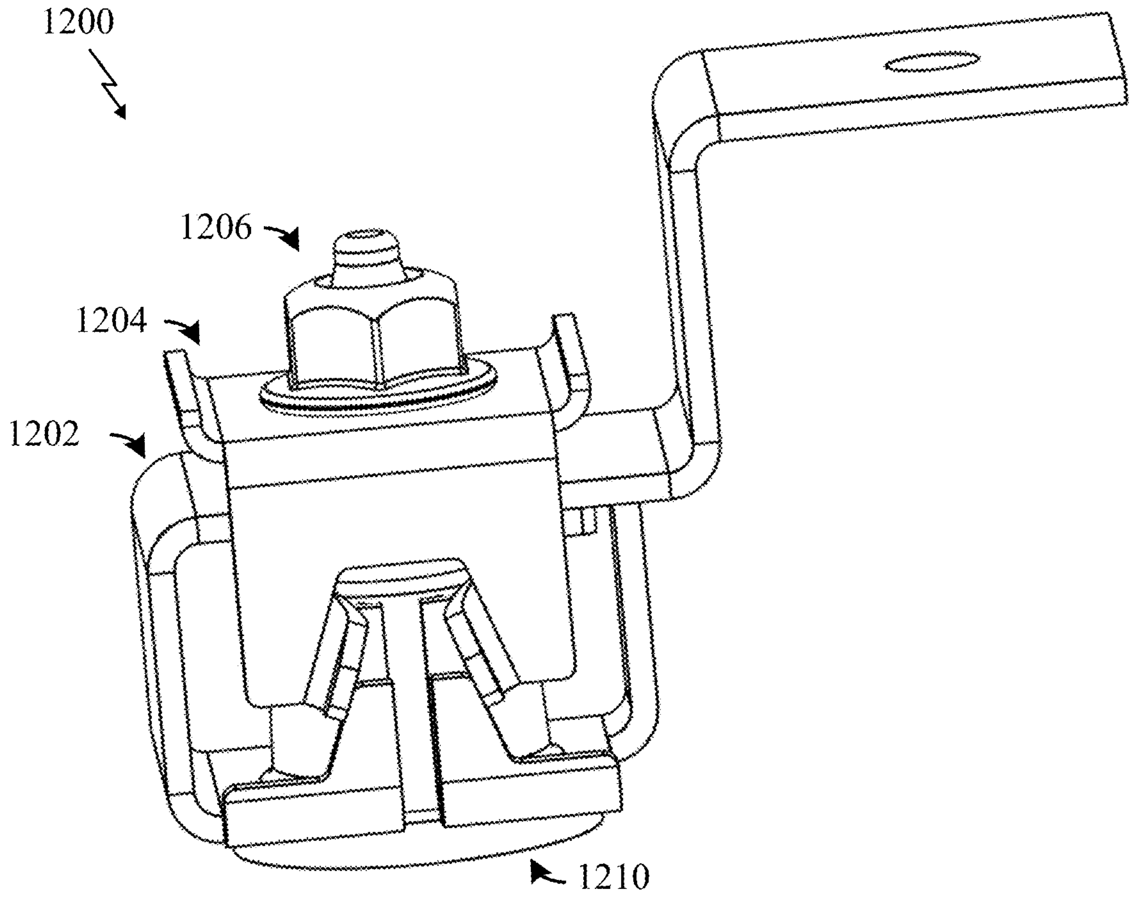
FIG. 12 illustrates an isometric view of an example of a battery terminal according to some embodiments.
Figure 13:
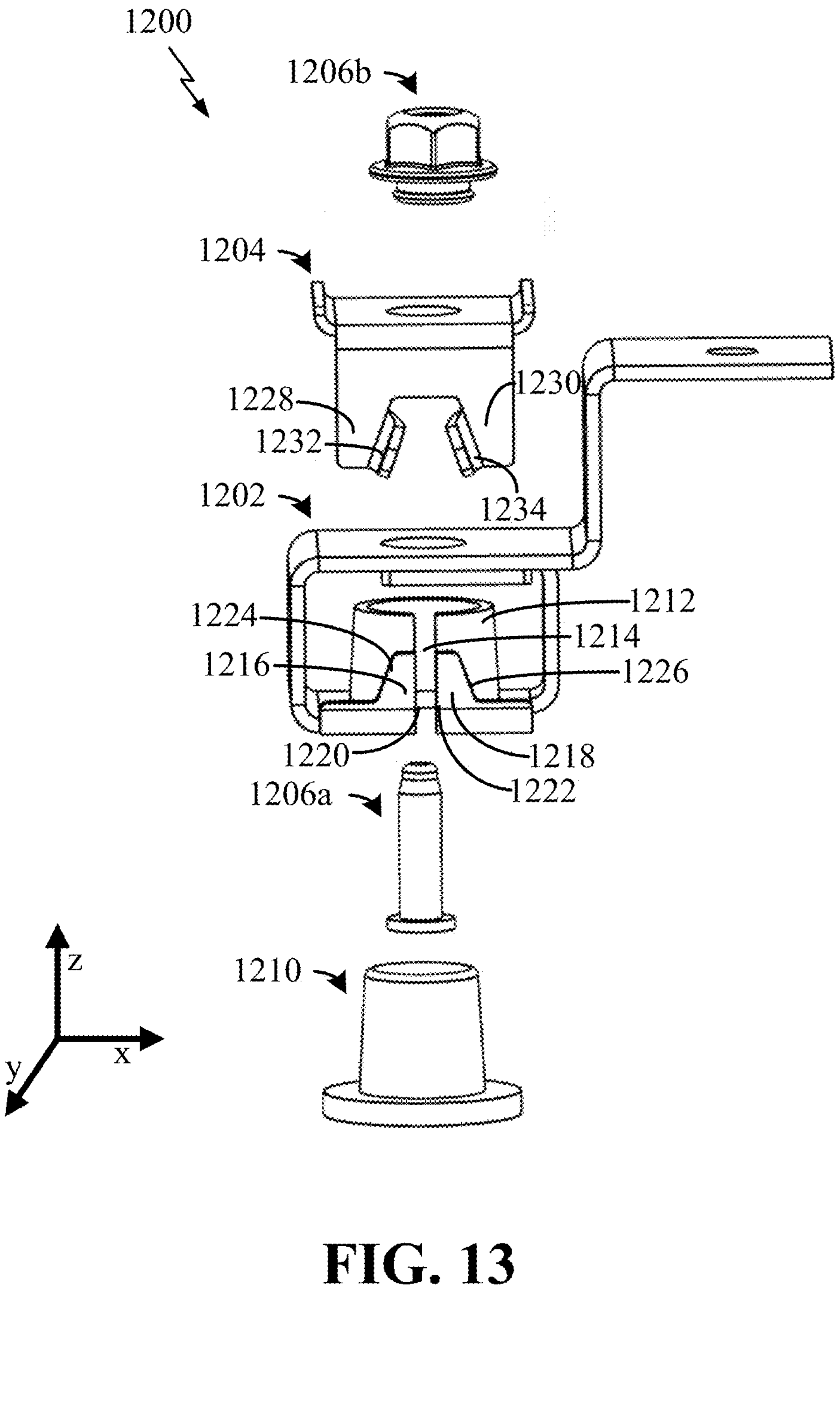
FIG. 13 is an exploded view of an example of the battery terminal of FIG. 12.
Figure 14:
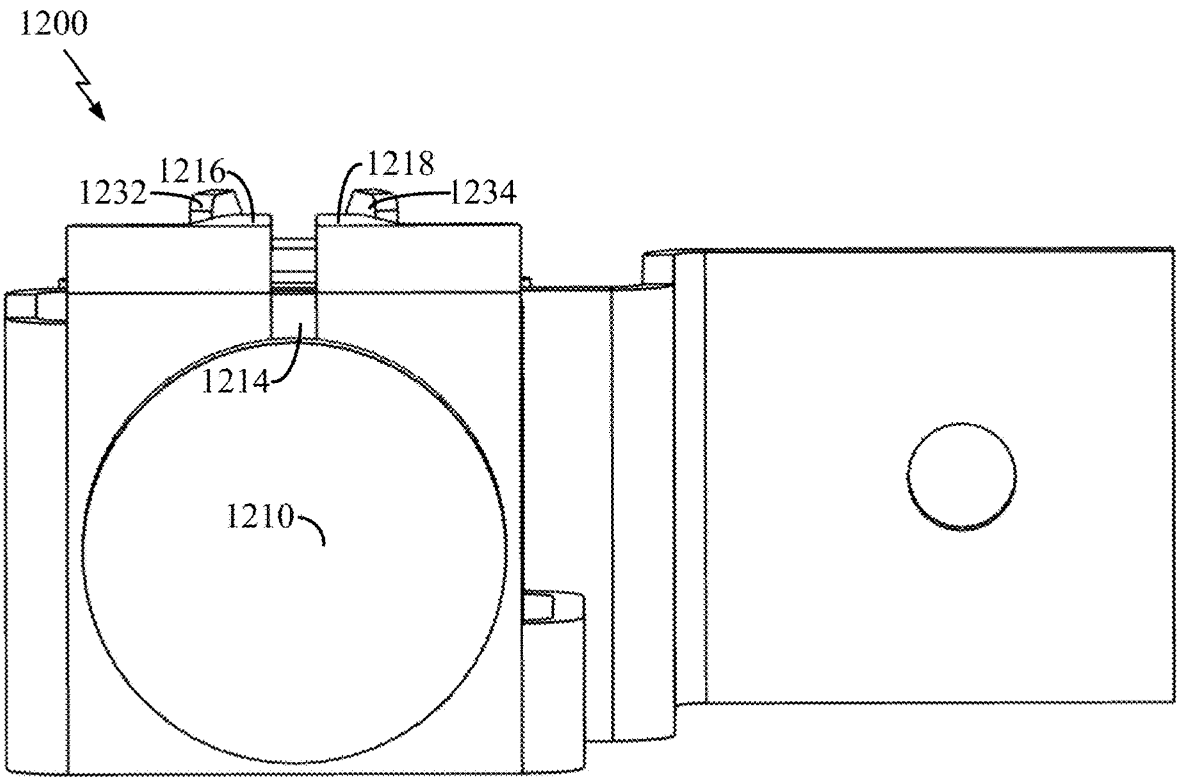
FIG. 14 is a bottom view of an example of the battery terminal of FIG. 12.

FIGS. 12-14 illustrate a third embodiment of a battery terminal 1200 according to some embodiments. The battery terminal 1200 may include a post clamp 1202, a mounting clamp 1204, and/or a fastener 1206 (e.g., a stud 1206*a* and a nut 1206*b*) for fastening the battery terminal 1200 to a battery post 1210. The battery terminal 1200, except for the description below, may function in a similar way as does the battery terminal 100 described in connection with FIGS. 1-8.

With reference still to FIGS. 12-14, the post clamp 1202 includes a post connector 1212, an opening 1214, a first angled guide 1216, and/or a second angled guide 1218. The post connector 1212 includes a first connector end 1220 and a second connector end 1222 to define the opening 1214 between the first connector end 1220 and the second connector end 1222. The first and second connector ends 1220, 1222 are connected to the first and second angled guides 1216, 1218, respectively. Thus, moving the first angled guide 1216 and the second angled guide 1218 leads to the movement of the first connector end 1220 and the second connector end 1222. For example, the first and second connector ends 1220, 1222 are directly connected to the first and second angled guides 1216, 1218, respectively. The first and second connector ends 1220, 1222 extend to the first and second angled guides 1216, 1218 in a direction from the axis (z-axis) of the post connector 1212 to the opening 1214. The first and second angled guides 1216, 1218 include first and second angled edges 1224, 1226, respectively. The first and second angled edges 1224, 1226 together may substantially constitute a reverse V shape ('/\'). The first and second angled guides 1216, 1218 are not directly connected to each other.

The mounting clamp 1204 may include a first limb 1228 and a second limb 1230. The first and second limbs 1228, 1230 may include first and second pressing pads 1232, 1234. In the unfastened position, the first pressing pad 1232 may have a contact point on the first angled edge 1224 between two ends of the first angled edge 1224. Similarly, in the unfastened position, the second pressing pad 1234 may have a contact point on the second angled edge 1226 between two ends of the second angled edge 1226. As the mounting clamp 1204 is fastened to the post clamp 1202, the first and second pressing pads 1232, 1234 move toward the bottom of the battery post 1210, which is connected to a battery. Then, the first and second angled guides 1216, 1218 move toward each other, and the first and second connector ends 1224, 1226 move toward each other to reduce the opening 1214. The reduced opening 1214 fastens the post connector 1212 onto the battery post 1210.

Figure 15:
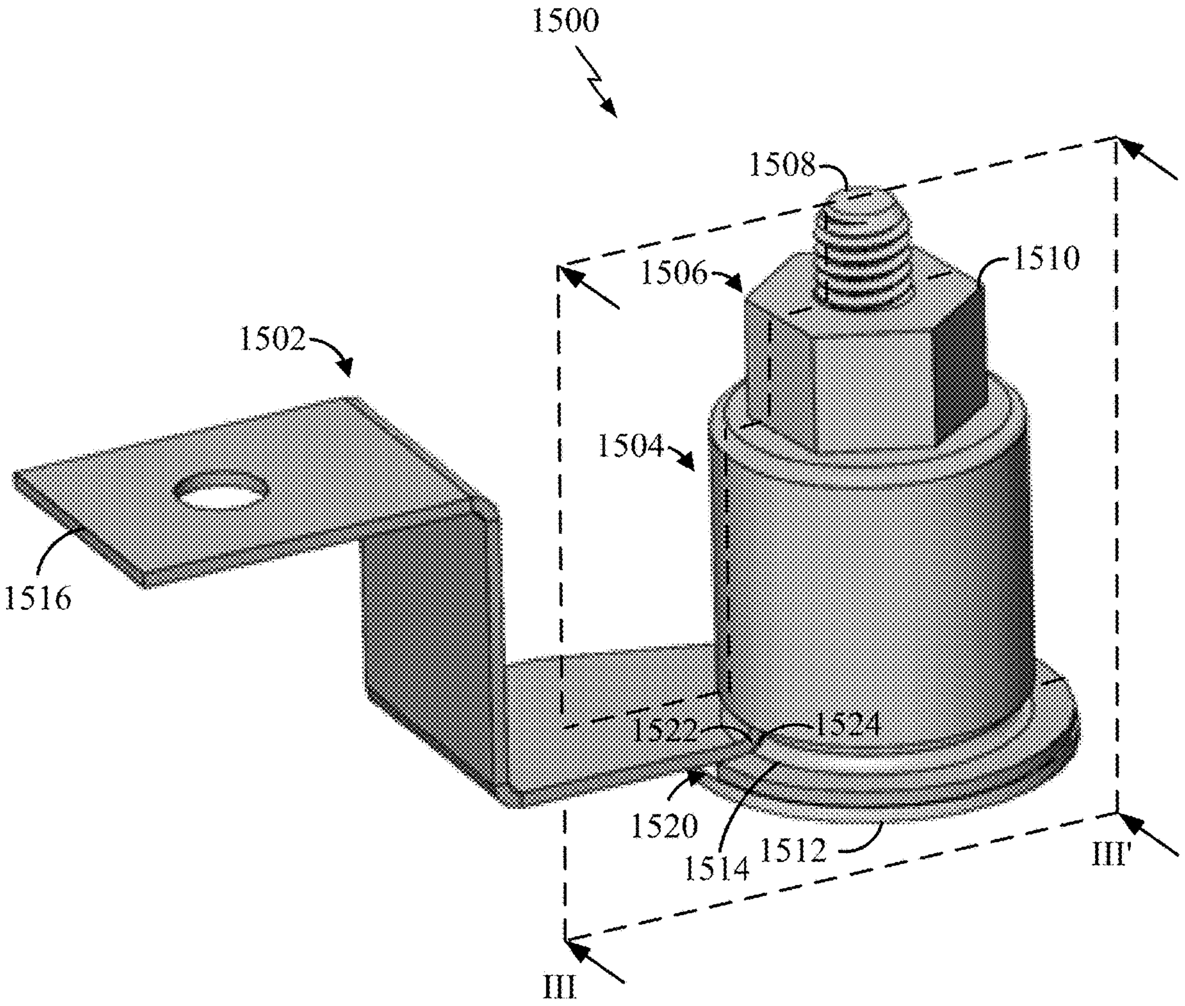
FIG. 15 illustrates an isometric view of an example of a battery terminal according to some embodiments.
Figure 16:
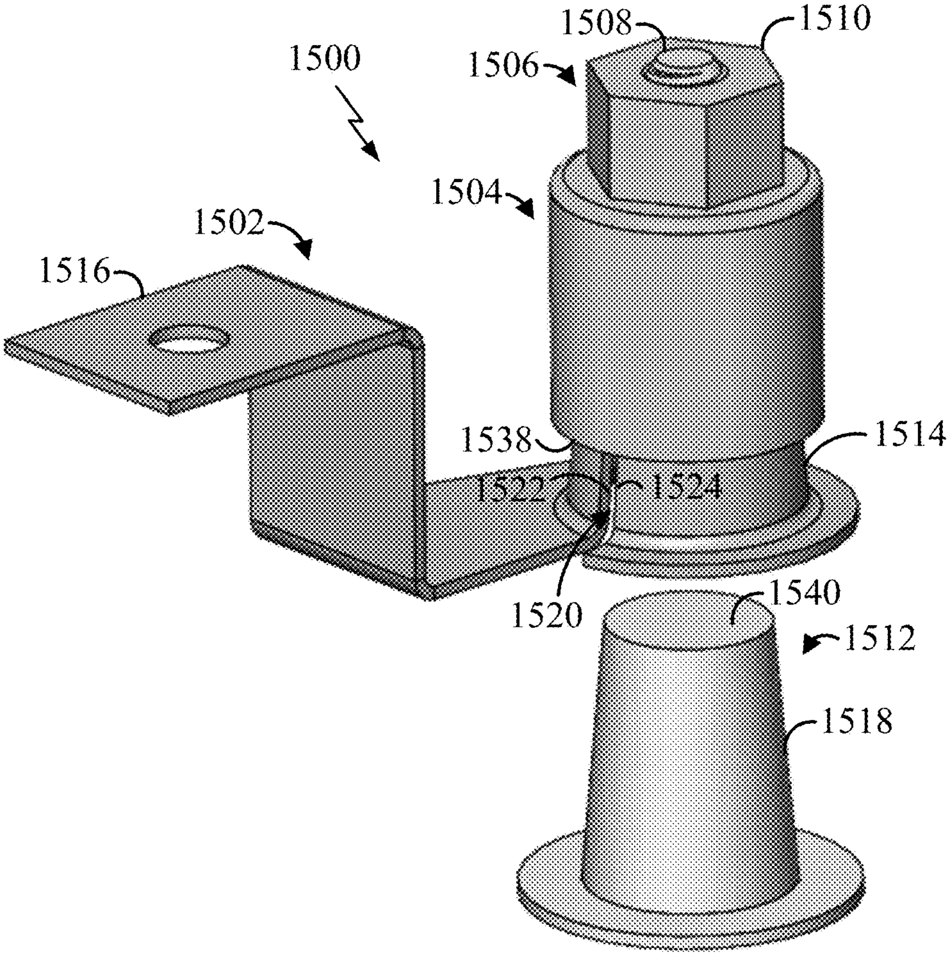
FIG. 16 is an isometric view of an example of the preassembled battery terminal of FIG. 15.
Figure 17:
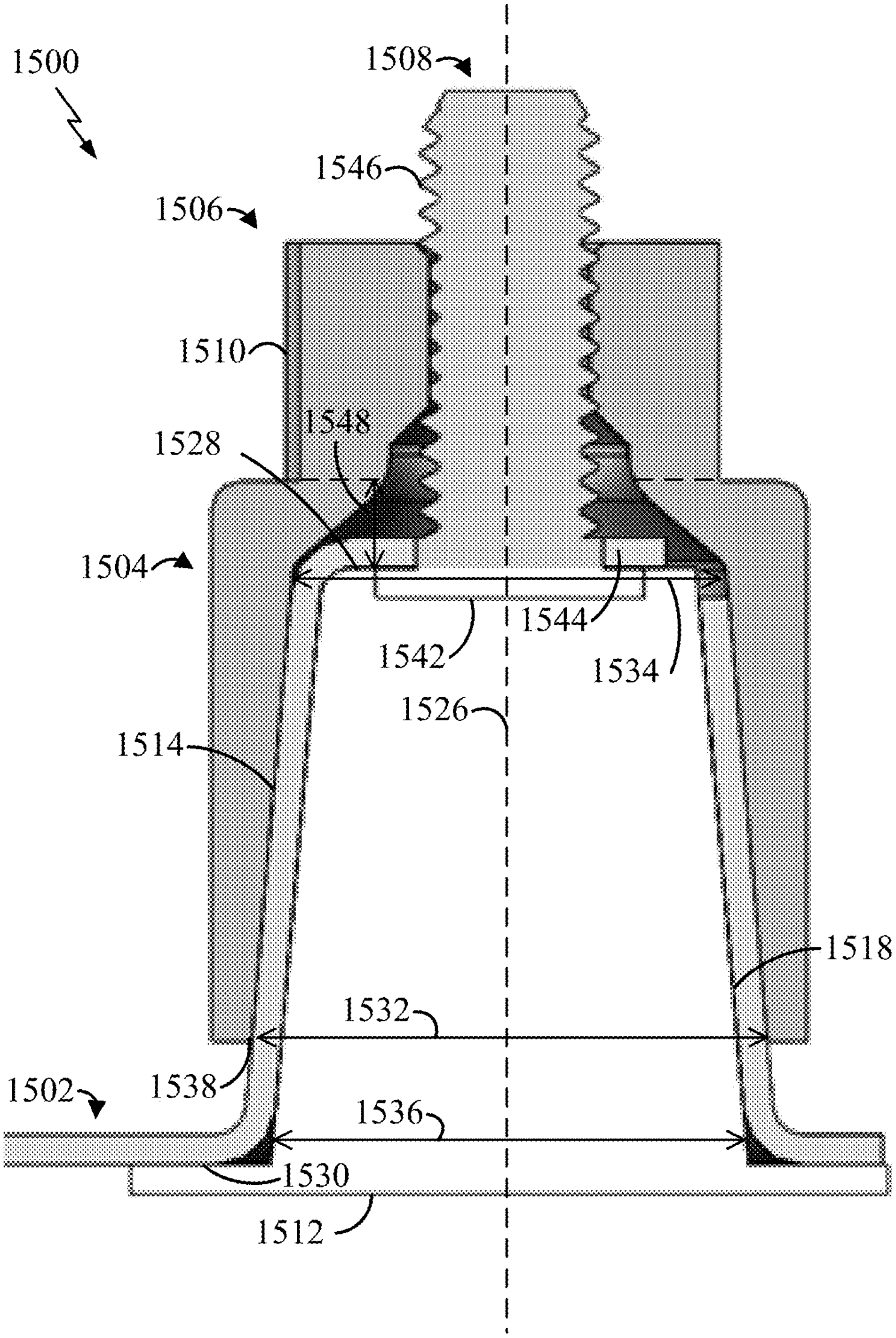
FIG. 17 is a sectional view of an example of the battery terminal taken along plane III-III' of FIG. 15.

FIGS. 15-17 illustrate a fourth embodiment of a battery terminal 1500. The battery terminal 1500 includes a post clamp 1502, a mounting clamp 1504, and/or a fastener 1506 (e.g., a stud 1508 and a nut 1510) for fastening the battery terminal 1500 to a battery post 1512. For example, the battery post 1512 is configured to be inserted into the post clamp 1504. The mounting clamp 1504 covers a part of the post clamp 1502, which covers the battery post 1512. The mounting clamp 1504 provides a pressing force (e.g., a vertical force) to the post clamp 1502 in a fastening position by the fastener 1506 to fasten the post clamp 1504 to the battery post 1512. The post clamp 1502 changes the pressing force to a fastening force (e.g., a horizontal force) to fasten the post clamp 1502 to the battery post 1512.

The post clamp 1502 includes a post connector 1514 and a system connector 1516. The post connector 1514 of the post clamp 1502 has a tapered shape (e.g., a tapered cylindrical shape) corresponding to the shape of the battery post 1512 (see FIGS. 16 and 17). Thus, the post connector 1514 is configured to substantially enclose and contact a first surface 1518 (e.g., a side surface) of the battery post 1512 to transmit an electric current from the battery post 1512 to the system connector 1516 of the post clamp 1502. In some embodiments, the outer surface shape of the post connector 1514 may not be the same as the inner surface shape of the post connector 1514. For example, the inner surface shape of the post connector 1514 may be the tapered cylindrical shape corresponding to the shape of the battery post 1512 while the outer surface shape of the post connector 1514 may be a truncated pyramid or any other suitable shape for the mounting clamp 1504 to provide the pressing force on the post connector 1514 and reduce an opening 1520 of the post connector 1514 in a horizontal direction.

The post connector 1514 includes a first connector end 1522 and a second connector end 1524 defining the opening 1520 therebetween, which allows for easy insertion of the battery post 1512 in an unfastened position, and for the fastening of the battery post 1512 by allowing for a reduction in the distance between the first connector end 1522 and the second connector end 1524. For example, FIG. 16 shows the battery terminal 1500 in an unfastened position such that the battery post 1512 can be easily inserted into the post connector 1514. On the other hand, FIG. 15 shows the battery terminal 1500 in a fastened position such that the post connector 1514 fastens the battery post 1512 by reducing the opening 1520 of the post connector 1514. The opening 1520 has an elongated shape on a first surface (e.g., a side surface) of the post connector 1514 in a vertical direction, which is the substantially same as an axis (z-axis) 1526 of the tapered cylindrical shape of the battery post 1512 (see FIG. 17). The opening 1520 extends between a top surface 1528 and a bottom base 1530 of the post connector 1514. The opening 1520 is disposed at a substantially right angle to the top surface 1528 and to the bottom base 1530 of the post connector 1514. The distance of the opening 1520 between the two ends 1522, 1524 of the post connector 1514 in the horizontal direction in the fastened position (see FIG. 15) is shorter than the distance between the two ends 1522, 1524 in the unfastened position (see FIG. 16). Thus, the distance of the opening 1520 in the horizontal direction is reduced in the fastened position by shortening the distance between the two ends 1522, 1524 of the post connector 1514. As the horizontal distance of the opening 1520 of the post connector 1514 is reduced, the inside volume of the post connector 1514 is also reduced to fasten the post connector 1514 to the battery post 1512. Thus, the battery post 1512 can be easily inserted in the post connector 1514 in an unfastened position and can be fastened to the post connector 1514 in a fastened position by reducing the distance in the opening 1520 between two ends 1522, 1524 of the post connector 1514 in the horizontal direction.

The system connector 1516 of the post clamp 1502 is connected to the post connector 1514 and is configured to be connected to a battery-operated system. The system connector 1516 is connected to the bottom base 1530 of the post connector 1514, which has a greater diameter than the top surface 1528 of the post connector 1514 (see FIG. 17). In some embodiments, the system connector 1516 is connected to one end of the two ends 1522, 1524 in the bottom base 1530 defining the opening 1520. However, it should be appreciated that the system connector 1516 may be connected to other parts of the bottom base 1530 of the post connector 1514. For example, the system connector 1516 may be connected to an opposite side of the bottom base 1530 and away from the opening 1520. The post clamp 1502 is configured to deliver an electric current from the battery post 1512 of a battery to the battery-operated system via the system connector 1516. In some embodiments, the system connector 1516 may be attached to a battery cable, which is connected to the battery-operated system.

The mounting clamp 1504 is configured to substantially enclose the post connector 1514 to fasten the post connector 1514 to the battery post 1512. The mounting clamp 1504 is disposed vertically above the post connector 1514. Preferably, an inner surface shape or inside space of the mounting clamp 1504 is fashioned to complement the outer surface shape of the post connector 1514. In the present embodiment, the inner surface of the mounting clamp 1504 has a tapered cylindrical shape that is complementary to the outer surface shape of the post connector 1514 so that the mounting clamp 1504 may be seated on the post connector 1514. Thus, a first diameter 1532 at the bottom base of the mounting clamp 1504 is longer than a second diameter 1534 at the top of the mounting clamp 1504. The first diameter 1532 at the bottom base of the mounting clamp 1504 in an unfastened position is longer than a third diameter 1536 at a bottom base 1530 of the post connector 1514. In the unfastened position (see FIG. 16), the bottom end 1538 of the mounting clamp 1504 contacts a point between the top surface 1528 and the bottom base 1530 of the post connector 1514 because the distance of the opening 1520 of the post connector 1514 is not reduced. Thus, the mounting clamp 1504 does not fully sit on the post connector 1514 in the unfastened position. In the unfastened position, the first diameter 1532 of the mounting clamp 1504 is the same as the diameter of the post connector 1514 at the point between the top surface 1528 and the bottom base 1530 of the post connector 1514. As the mounting clamp 1504 is fastened to the post connector 1514, the contact point of the bottom end 1538 of the mounting clamp 1504 to the post connector 1514 moves downward to the bottom base 1530 of the post connector 1514. Since the post connector 1514 is the tapered cylindrical shape, the downward movement of the mounting clamp 1504 on a tilted surface of the post connector 1514 generates a fastening force in the horizontal direction to reduce the inner space of the post connector 1514. The fastening force on the post connector 1514 reduces the distance of the opening 1520 of the post connector 1514. In the fastened position (see FIGS. 15 and 17), the mounting clamp 1504 fully sits on the post connector 1514 because the distance of the opening 1520 of the post connector 1514 is reduced until the battery post 1512 is fully clamped to the post connector 1514. In other embodiments, the inner surface shape of the mounting clamp 1504 is not limited to the tapered cylindrical shape. For example, the inner surface shape of the mounting clamp 1504 may be a truncated pyramid or any other suitable shape to correspond to the outer shape of the post connector 1514 and provide the pressing force on the post clamp 1502 to reduce the opening 1520 of the post clamp 1502 in a horizontal direction.

In some embodiments, the outer surface shape of the mounting clamp 1504 is a cylindrical shape. However, the outer surface shape of the mounting clamp 1504 can be any other suitable shape so long as the mounting clamp 1504 has an inner surface shape that is complementary to the outer surface shape of the post connector 1514.

The fastener 1506 is configured to fasten the mounting clamp 1504 to the post clamp 1514. The fastener 1506 includes a stud 1508 and a nut 1510. The stud 1508 and the nut 1510 are configured to be provided vertically above a top surface or a second surface 1540 of the battery post 1512 (see FIG. 16). The stud 1508 is configured to be placed at a substantially right angle to the top surface 1540 of the battery post 1512 such that the nut 1510 is configured to be inserted onto the stud 1508 in the vertical direction at the substantially right angle to the top surface or the second surface 1540 of the battery post 1512. When a tool (e.g., socket driver) tightens the nut 1510, the operator of the tool may use a downward force to tighten the nut 1510. Thus, the tool for the nut 1510 is configured to be axially in-line with battery post 1512. The downward force on the post connector 1514 ensures that it fully seats down on the battery post 1512. At the same time, as the nut 1510 fastens the stud 1508, the post connector 1514 moves downward, and the distance of the opening 1520 between the two ends 1522, 1524 of the post connector 1514 in the horizontal direction is reduced. This clamping mechanism therefore interacts with the top-down tool such that it provides the maximum clamp force onto the battery post 110. Using this clamping mechanism, the battery terminal 1500 can be fully installed when the bottom base 1530 of the post connector 1514 contacts the bottom surface of battery post 1512.

Referring to FIG. 17, the stud 1508 is attached to the post connector 1514 of the post clamp 1502. More specifically, a head 1542 of the stud 1508 is held against the top surface 1528 of the post connector 1514. An upper plate 1544 of the post connector 1514 is substantially parallel to the top surface 1540 of the battery post 1512 (see FIG. 16). Thus, the stud 1508 may not move up/down or rotate. In some embodiments, the stud 1508 is part of the post clamp 1502. In addition, the stud 1508 has a thread 1546 having a cylindrical shape on a side surface of the stud 1508. The stud 1508 may protrude from the top plate 1534 of the post connector 1514 through a hole on the top plate 1534. The diameter of the stud 1508 fits into the hole on the top plate 1534 of the post connector 1514, and the size of the head 1542 is larger than the hole on the top plate 1534 of the post connector 1514.

The nut 1510 includes an internal thread and is configured to move downward according to the thread 1546 of the stud 1508 to fasten the mounting clamp 1504 to the post connector 1514. The nut 1510 is part of the mount clamp 1504. Thus, as the operator rotates the nut 1510, the mount clamp 1504 spins around with the nut and moves downward to fasten the post connector 1514 to the battery post 1512. In other embodiments, the nut 1510 may be a free-spinning nut attached to the mounting clamp 1504 as described in connection with FIG. 4 or a loose nut (not pre-assembled). In such an embodiment, when the nut 1510 is rotated, the mount clamp 1504 does not rotate with the nut 1510 but moves downward to fasten the post connector 1514 to the battery post 1512. Thus, in the fastened position, the mounting clamp 1504 provides the pressing force to the post clamp 1502 based on the stud 1508 and the nut 1510. In some embodiments, the nut 1510 is a hexagonal shape to easily turn. However, the nut 1510 may be any other suitable shape for the operator to easily rotate the nut 1510.

In operation, as the nut 1510 moves toward the head 1542 of the stud 1508, a distance 1548 between the nut 1510 and the head 1542 of the stud 1508 is reduced. As a result, the mounting clamp 1504 attaching the nut 1510 moves toward the post connector 1514 that is in engagement with the stud 1508, and a distance between the mounting clamp 1504 and the post connector 1514 is reduced. Here, the distance between the mounting clamp 1504 and the post connector 1514 is the distance 1548 between the nut 1510 and the head 1542 of the stud 1508. Then, as the distance between the mounting clamp 1504 and the post connector 1514 is reduced, the opening 1520 of the post connector 1514 is reduced and the post connector 1514 is fastened to the battery post 1512. Thus, the fastener 1506 is configured to reduce the distance 1548 between the mounting clamp 1504 and the post connector 1514 while contemporaneously reducing the opening 1520 of the post connector 1514 and fastening the post connector 1514 to the battery post 1512.

Referring to FIG. 16, the post clamp 1502, the mounting clamp 1504, and the fastener 1506 can be pre-assembled in the unfastened position. Thus, the post clamp 1502, the mounting clamp 1504, and the fastener 1506 as a single part can be shipped together. An operator does not need to assemble the post clamp 1502, the mounting clamp 1504, and the fastener 1506 separately, but can place them together over the battery post 1512 to fasten the battery terminal 1500 to the battery post 1512 (see FIG. 15).

In some embodiments, the post clamp 102, 902, 1202, 1502, the mounting clamp 104, 904, 1204, 1504, and the fastener 106, 906, 1206, 1506 can be pre-assembled together in the unfastened position. In other embodiments, the post clamp 102, 902, 1202, 1502, the mounting clamp 104, 904, 1204, 1504, and the fastener 106, 906, 1206, 1506 can be separately provided items.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The terms "about" and "approximately" indicate plus or minus 5% of the numeric value that each term precedes. The entire disclosure of each patent and publication cited herein is incorporated by reference, as if each such patent or publication were individually incorporated by reference herein.

We claim:

1. A battery terminal, comprising:

a post clamp for connecting to a battery post, wherein the post clamp comprises a post connector having a first connector end and a second connector end defining an opening therebetween, and wherein the post connector is configured to substantially enclose a first surface of the battery post;

a mounting clamp for reducing the opening between the first connector end and the second connector end; and a fastener disposed vertically above the mounting clamp and the post connector, the fastener configured to be provided vertically above a top surface of the battery post for fastening the mounting clamp to the post clamp.

2. The battery terminal of claim 1, wherein the first connector end is connected to a first angled guide with respect to a first direction, wherein the second connector end is connected to a second angled guide with respect to the first direction, and wherein the mounting clamp contacts the first angled guide and the second angled guide.

3. The battery terminal of claim 2, wherein the mounting clamp comprises a first limb and a second limb, wherein the first limb comprises a first limb end and a second limb end corresponding to a first guide end and a second guide end of the first angled guide, respectively, wherein the second limb comprises a third limb end and a fourth limb end corresponding to a third guide end and a fourth guide end of the second angled guide, respectively, and wherein a first distance between the first limb end and the third limb end is shorter than a second distance between the second limb end and the fourth limb end.

4. The battery terminal of claim 3, wherein a third distance between the first guide end and the third guide end is shorter than a fourth distance between the second guide end and the fourth guide end.

5. The battery terminal of claim 3, wherein the second distance between the second limb end and the fourth limb end is shorter than a fourth distance between the second guide end and the fourth guide end in an unfastened position.

6. The battery terminal of claim 1, wherein the opening between the first connector end and the second connector end is smaller in a fastening position than when in an unfastened position.

7. The battery terminal of claim 6, wherein the fastener is configured to reduce a distance between the mounting clamp and the post connector for reducing the opening of the post connector and fastening the post connector to the battery post.

8. The battery terminal of claim 1, wherein the mounting clamp substantially encloses the post connector.

9. The battery terminal of claim 8, wherein an outer surface shape of the post connector is a tapered shape.

10. The battery terminal of claim 1, wherein the fastener comprises a stud and a nut, wherein the nut is attached to the mounting clamp, and wherein the stud is attached to the post connector.

11. The battery terminal of claim 1, wherein the post connector includes one or more protuberances to increase clamp retention onto the battery post.

* * * * *